US012781778B2

(12) United States Patent
Chen

(10) Patent No.: US 12,781,778 B2
(45) Date of Patent: Nov. 3, 2026

(54) CLAMPING DEVICE FOR HANGING

(71) Applicant: SPORTSMAN CORPORATION, New Taipei City (TW)

(72) Inventor: Jack Chen, New Taipei City (TW)

(73) Assignee: SPORTSMAN CORPORATION, New Taipei City (TW)

( * ) Notice: Subject to any disclaimer, the term of this patent is extended or adjusted under 35 U.S.C. 154(b) by 44 days.

(21) Appl. No.: 19/016,668

(22) Filed: Jan. 10, 2025

(65) Prior Publication Data

US 2026/0201916 A1 Jul. 16, 2026

(51) Int. Cl.

*F16B 2/06* (2006.01)
*F16M 13/02* (2006.01)

(52) U.S. Cl.

CPC ........... *F16B 2/065* (2013.01); *F16M 13/022* (2013.01)

(58) Field of Classification Search

CPC .. F16M 13/022; A47C 31/023; B60N 2/5825; F16B 5/0692; F16B 5/0685; F16B 2/065

See application file for complete search history.

(56) References Cited

U.S. PATENT DOCUMENTS

| | | | | |
|---|---|---|---|---|
| 5,826,312 | A * | 10/1998 | Schroder | F16B 45/024 24/601.2 |
| 9,242,186 | B2 * | 1/2016 | Hoffend, III | B66C 1/36 |
| 9,915,283 | B2 * | 3/2018 | Chen | F16M 11/041 |
| 10,673,215 | B2 * | 6/2020 | Matsuo | H02G 3/0456 |
| 11,644,148 | B2 * | 5/2023 | Follis | F16M 13/022 248/220.22 |
| 11,746,949 | B2 * | 9/2023 | Kairy, Jr. | F16M 11/08 248/122.1 |
| 12,534,916 | B2 * | 1/2026 | Moss | E04D 3/36 |
| 2013/0117973 | A1 | 5/2013 | Murasaki et al. | |

FOREIGN PATENT DOCUMENTS

| | | |
|---|---|---|
| TW | M559164 U | 5/2018 |

* cited by examiner

*Primary Examiner* — Bradley Duckworth

(74) *Attorney, Agent, or Firm* — MUNCY, GEISSLER, OLDS & LOWE, P.C.

(57) ABSTRACT

A clamping device for hanging is configured to connect with a planar unit. The clamping device comprises a connecting unit and two clamp units. The connecting unit has a first connecting portion and a second connecting portion, and the planar unit is connected to the first connecting portion. The two clamping units are connected to the second connecting portion. The two clamping units are arranged side by side and movable toward or away from each other. Each of the two clamping units has a connecting end and a clamping end. The connecting end is connected to the second connecting portion, and the clamping end extends away from the connecting unit. The clamping device is connected to a frame structure by means of clamping with the clamping units, and thus even if the frame structure is not rod-shaped, the clamping device is still capable of connecting with the frame structure.

11 Claims, 4 Drawing Sheets

CLAMPING DEVICE FOR HANGING

BACKGROUND

1. Field of the Invention

The present invention relates to a clamping device for hanging, especially to a clamping device for hanging that is configured to help hang or expand a planar unit.

2. Description of the Prior Arts

Tents, nets, cloth sheds, or curtains include planar units such as clothes or meshes hung or expanded on frames. A hanging device is connected to the edges of the planar unit, and the planar unit is hung or expanded via the hanging device. The conventional hanging device includes a connecting part and a strap securely connected to each other, in which the connecting part is connected to the edge of the planar unit and the strap is wrapped on the frame.

Furthermore, a rain cover of a golf cart which is applied to move in a vast field has similar structures. To be more precise, the golf cart has a roof arranged on the top, and the lateral sides of the gold cart are opened but only a few simple frames for connecting with the roof. Therefore, the user connects the conventional hanging devices to the edges of the rain cover via the connecting parts, and then wraps the straps on the frames to hang the rain cover, preventing the rain from entering into the passengers'seats.

However, recently more and more golf carts have windshields embedded in the frames in front of the driver, and the edges of the windshields are sealed with the frames, so the straps cannot be wrapped on the frames any more, and thus the conventional hanging devices can no longer be used.

To overcome the shortcomings, the present invention provides a clamping device for hanging to mitigate or obviate the aforementioned problems.

SUMMARY

The main objective of the present invention is to provide a clamping device for hanging that is capable of helping hang or expand a planar unit, especially the planar unit connected to or hung on the frame structures which are not rod-shaped.

The clamping device for hanging, which is configured to connect a planar unit, comprises a connecting unit and two clamping units. The connecting unit has a first connecting portion and a second connecting portion. The first connecting portion has a groove forming a gap on a surface of the connecting unit. A width of the gap being less than a maximal width of the groove. The planar unit is connected to the first connecting portion by being disposed through the gap. The two clamping units are mounted on the second connecting portion of the connecting unit, and the two clamping units are arranged side by side and are capable of moving toward or away from each other. Each one of the clamping units comprises a connecting end and a clamping end. The connecting end is connected to the second connecting portion, and the clamping end extends along a direction away from the connecting unit.

The clamping device for hanging in this disclosure connects with the frame structure via clamping with the clamping units, and thus even if the frame structure is not rod-shaped, the clamping device for hanging in this disclosure is still capable of connecting with said frame structure. Due to being fixed via means other than wrapping, the clamping device for hanging in this disclosure is capable of helping hang the planar unit on the frame structures in different types, such as edges of a windshield, or a casing of a door or a window, to fulfill the more diverse needs of the user.

Other objectives, advantages and novel features of the invention will become more apparent from the following detailed description when taken in conjunction with the accompanying drawings.

DETAILED DESCRIPTION

Figure 1:
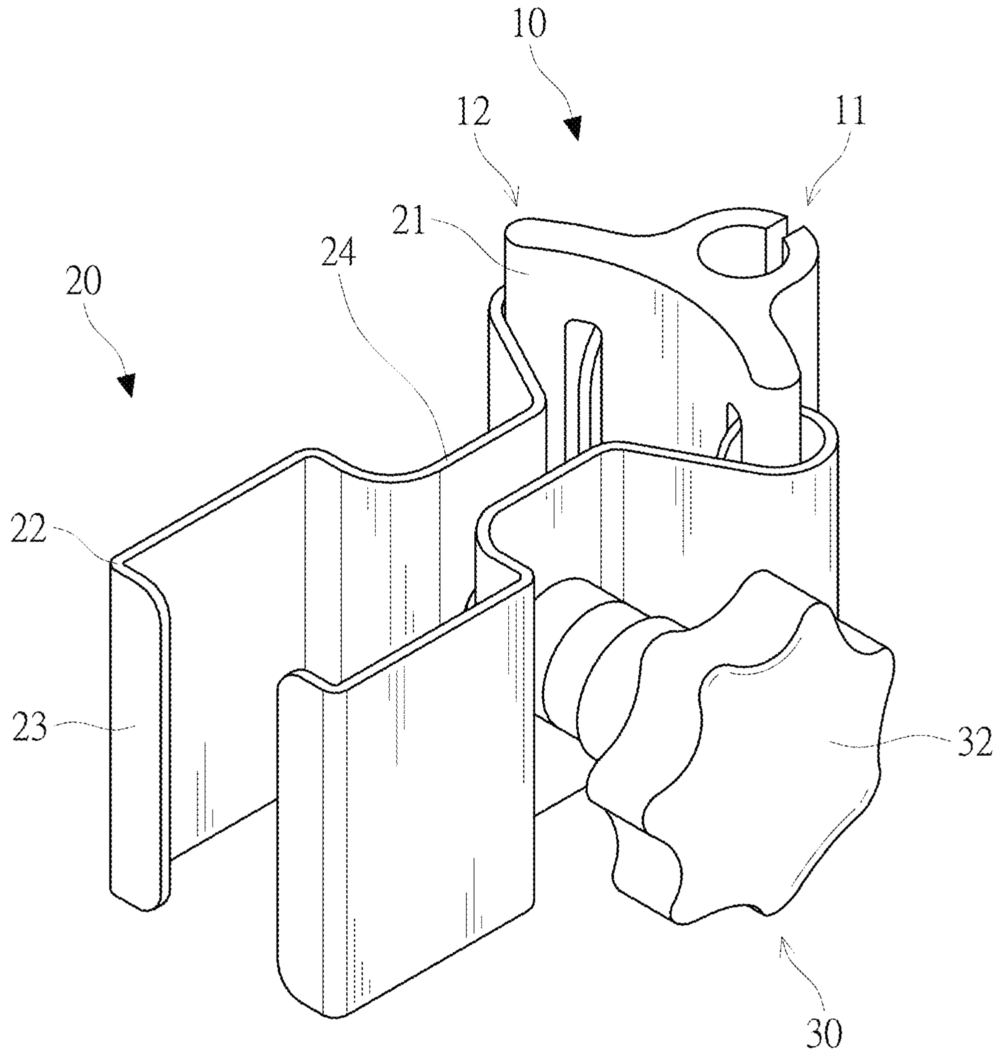
FIG. 1 is a perspective view of a clamping device for hanging in accordance with the present invention.

With reference to FIGS. 1 to 4, a clamping device for hanging in accordance with the present invention is configured to connect a planar unit A. In this embodiment, the planar unit A has an engaging rod A1 mounted at the edge, and the engaging rod A1 extends along the edge of the planar unit A, but it is not limited thereto.

The clamping device for hanging in this disclosure comprises a connecting unit 10, two clamping units 20, and an adjusting assembly 30.

The connecting unit 10 comprises a first connecting portion 11 and a second connecting portion 12, and the planar unit A is connected to the first connecting portion 11. Specifically, the first connecting portion 11 forms a groove 111, and the engaging rod A1 engages in the groove 111. The groove 111 is formed through and penetrates two opposite end surfaces of the connecting unit 10, and the groove 111 forms a gap 112 on a lateral surface of the connecting unit 10. In this embodiment, the engaging rod A1 is cylindrical in shape, and a shape of the groove 111 corresponds to the engaging rod A1, and a width of the gap 112 is less than a maximal width of the groove 111. Thus the engaging rod A1 is fixed in the groove 111 and the planar unit A is disposed through the gap 112.

The second connecting portion 12 is connected to a side of the first connecting portion 11, and said side is away from the gap 112. In this embodiment, the second connecting portion 12 comprises two wing parts 121 and two slots 122. The two wing parts 121 are connected to two opposite sides of the first connecting portion 11 respectively and extend along directions away from each other. Furthermore, the two wing parts 121 bend toward a direction away from the first connecting portion 11, but it is not limited thereto.

The two slots 122 are formed through the two wing parts 121 respectively, and in this embodiment, each one of the slots 122 is an elongated straight slot and extends along a lengthwise direction of the groove 111 of the first connecting portion 11, but it is not limited thereto, as the shape of the slot 122 may be altered according to needs.

The two clamping units 20 are mounted on the second connecting portion 12 of the connecting unit 10. The two clamping units 20 are arranged side by side and are capable of moving toward or away from each other. In this embodiment, each one of the clamping units 20 has a connecting end 21, a clamping end 22, an abutting portion 23, and a bent portion 24.

The connecting end 21 is connected to the second connecting portion 12. To be more precise, the connecting end 21 of each one of the clamping units 20 is bent and hook-shaped, and the connecting ends 21 of the two clamping units 20 are mounted through the two slots 122 respectively, and thereby the clamping units 20 hook on the second connecting portion 12 of the connecting unit 10, facilitating ease in assembly and disassembly. In addition, the connection between the connecting unit 10 and each one of the clamping units 20 may be configured as a pivot, for being beneficial to distance adjustment between the two clamping units 20, but it is not limited thereto, as the configuration of the connecting end 21 of the clamping unit 20 may be altered according to needs.

The clamping end 22 extends along a direction away from the connecting unit 10. The abutting portion 23 is connected to the clamping end 22 and extends toward another one of the clamping units 20. In this embodiment, the abutting portion 23 is flat in shape, and the abutting portions 23 of the two clamping units 20 extend toward each other, but it is not limited thereto, as the clamping end 22 may not have the abutting portion 23, or a configuration of the abutting portion 23 may be altered according to needs.

The bent portion 24 is located between the connecting end 21 and the clamping end 22, and the bent portion 24 of each one of the clamping units 20 protrudes toward another one of the clamping units 20. In this embodiment, the bent portion 24 and the abutting portion 23 are spaced apart from each other, such that a recess is formed between the bent portion 24 and the abutting portion 23.

The adjusting assembly 30 is connected to the two clamping units 20 and capable of adjusting the distance between the two clamping units 20. The adjusting assembly 30 in this embodiment comprises a threaded rod 31, a handle 32, and a nut 33. The threaded rod 31 is mounted and penetrates through the bent portion 24, and the handle 32 is connected to an end of the threaded rod 31. The nut 33 is screwed on the threaded rod 31, and the two clamping units 20 are located between the handle 32 and the nut 33. The distance between the two clamping units 20 are fixed by the nut 33 and the handle 32. In addition, the nut 33 in this embodiment is secured on one of the clamping units 20, and the threaded rod 31 penetrates from another one of the clamping units 20 and is fastened with the nut 33, but it is not limited thereto, as the nut 33 may not be secured on the clamping unit 20.

Figure 3:
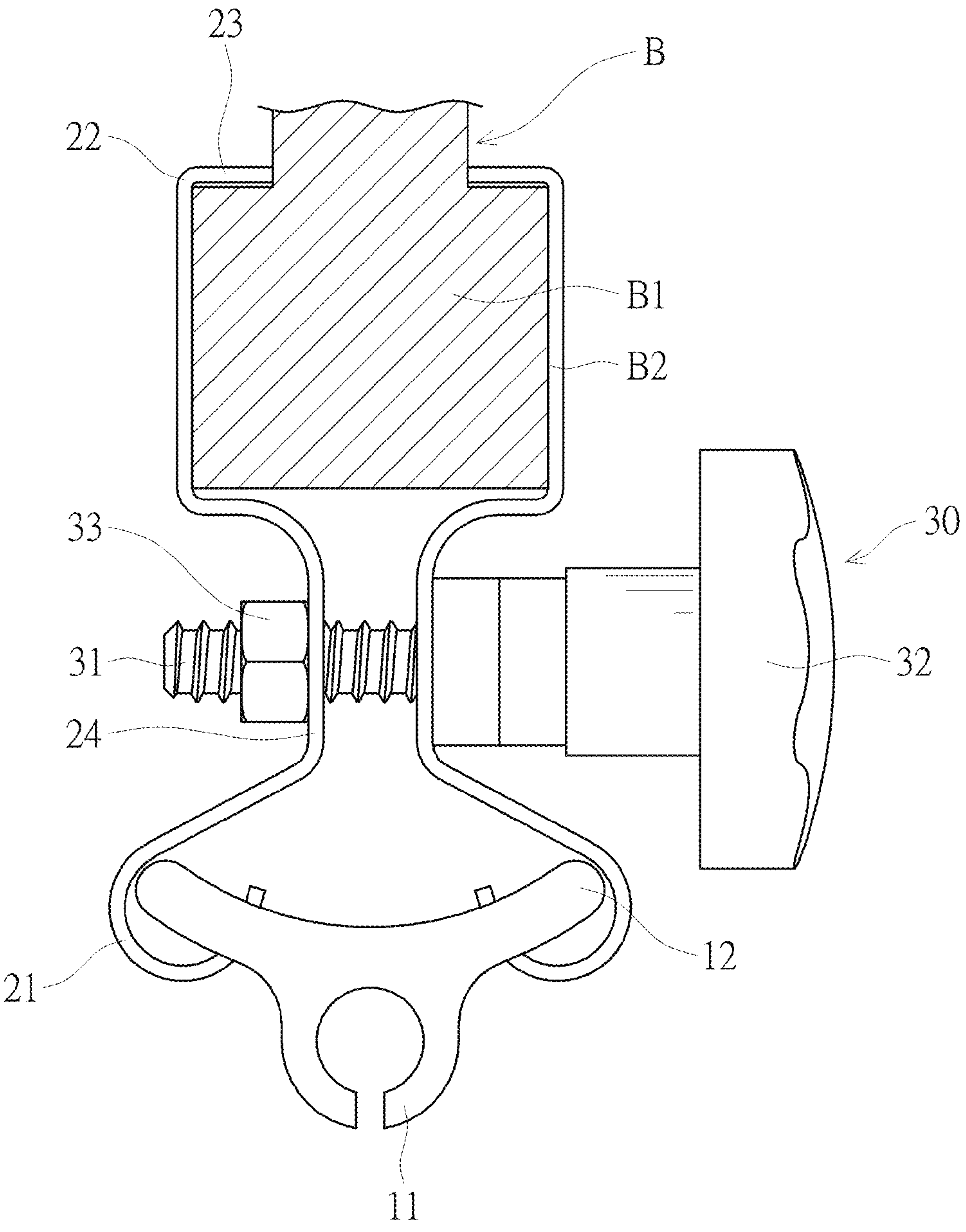
FIG. 3 is a top view of the clamping device in FIG. 1, shown clamping on a frame structure which is not rod-shaped.

With reference to FIG. 3, to clamp the clamping device in this disclosure on a frame structure B which is not rod-shaped, the user may dispose the frame structure B between the two clamping units 20 first, and t hen adjusts the distance between the two clamping units 20 with the adjusting assembly 30 to sandwich the frame structure B by the two clamping units 20, and thereby the clamping device in this disclosure clamps on the frame structure B.

Furthermore, the frame structure B shown in FIG. 3 has a bulged protruding edge B1. The user may pass the protruding edge B1 through a gap between the abutting portions 23 of the two clamping units 20, and then disposes the protruding edge B1 in the recess between the bent portion 24 and the abutting portion 23 of each one of the clamping units 20, and decreases the distance between the two clamping units 20 via the adjusting assembly 30 thereafter, and thus the protruding edge B1 would not pass through the gap between the abutting portions 23 of the two clamping units 20. Meanwhile, the abutting portions 23 also abut on the top side of the protruding edge B1, and thereby the clamping device in this disclosure is hung on the frame structure B, slip-proof. In FIG. 3, the two clamping units 20 cling to the two lateral surfaces B2 of the frame structure B, but it is not limited thereto, as the clamping units 20 may not cling to the lateral surfaces B2 and are only hung by the abutting portions 23 contacting the top side of the protruding edge B1.

Figure 2:
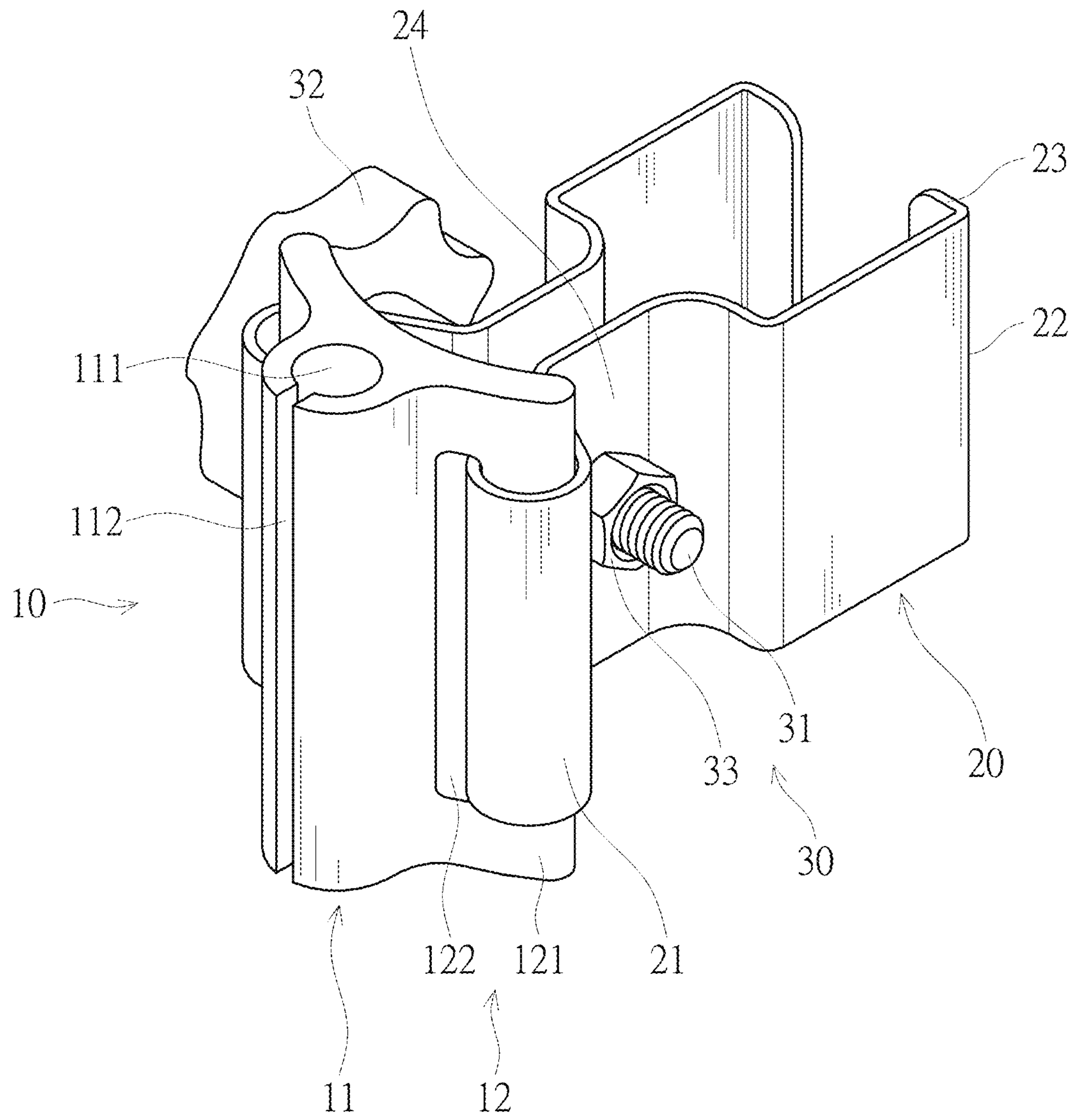
FIG. 2 is another perspective view of the clamping device in FIG. 1, viewed from a different angle from FIG. 1.
Figure 4:
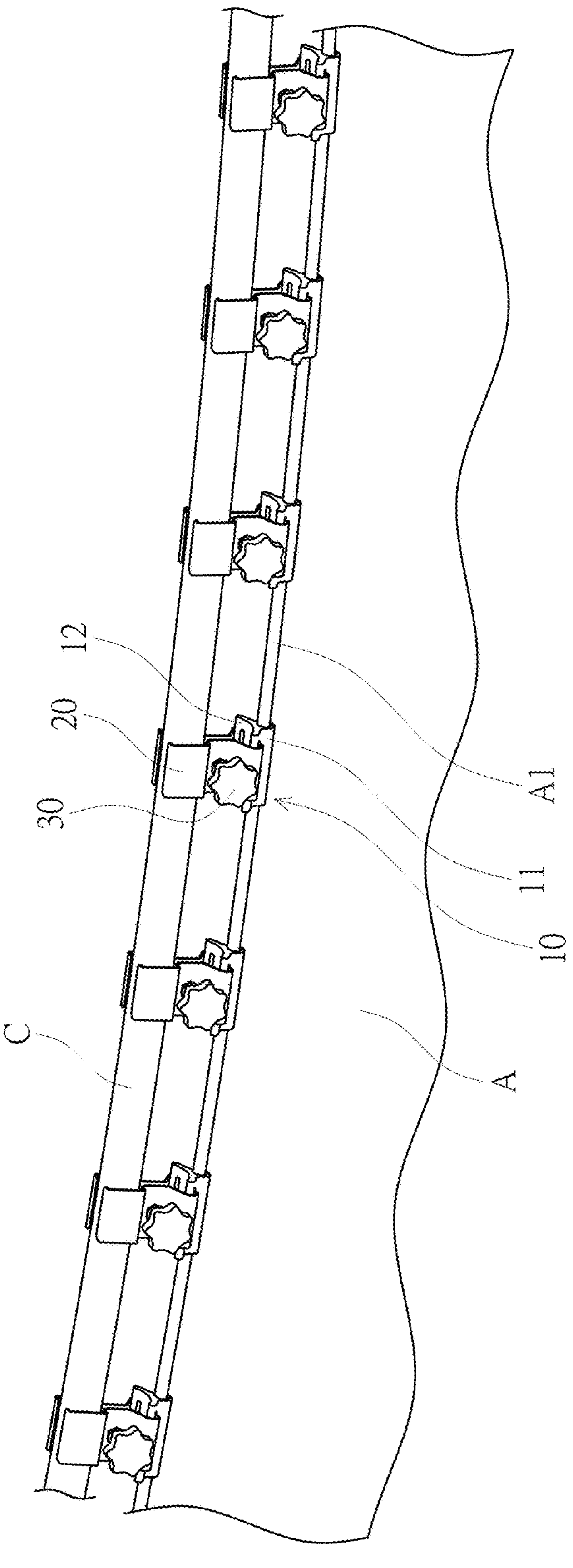
FIG. 4 is a perspective usage diagram of the clamping device in FIG. 1, showing a planar unit hung by the clamping device.

With reference to FIGS. 2 and 4, the engaging rod A1 at the edge of the planar unit A engages in the groove 111 of the first connecting portion 11, and the planar unit A is disposed through the gap 112. Since the shape of the engaging rod A1 corresponds to the groove 111 and the width of the gap 112 is less than the maximal width of the groove 111, the engaging rod A1 would not pass through and be separated from the gap 112, and thus the planar unit A can be securely mounted on the first connecting portion 11 of the connecting unit 10 and further hung on the frame structure C via the clamping device for hanging in this disclosure.

The clamping device for hanging in this disclosure connects with the frame structure B via clamping with the clamping units 20, and thus the clamping device for hanging in this disclosure can still be applied to a frame even if said frame structure B is not rod-shaped, such as a frame mounting a windshield in the front of a golf cart which does not have a gap between the windshield and the frame for a strap to pass through, and thus is incapable for a conventional hanging device to connect via the strap wrapped on. Fixed via means other than wrapping, the clamping device for hanging in this disclosure is capable of helping hang the planar unit A on the frame structures in different types, such as edges of a windshield, or a casing of a door or a window, to fulfill more diverse needs of the user.

Furthermore, the clamping units 20 in this disclosure hook through the slots 122 of the second connecting portions 12 of the connecting unit 10, thereby improving mobilities of the clamping units 20 with respect to the connecting unit 10, such that the clamping device for hanging in this disclosure may be applicable to the frame structures in more different sizes, and the clamping units 20 are easy to assemble or disassemble from the connecting unit 10. Besides, the clamping device for hanging in this disclosure adopts the threaded rod 31 and the nut 33 as the adjusting assembly 30 to adjust the distance between the two clamping units 20, such means is simple and easy to operate, and thus the clamping device for hanging in this disclosure may be "fastened" on the frame structure in a slip-proof manner, being capable of hanging or expanding the planar unit A which is heavy or has strong elasticity.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A clamping device for hanging configured to connect a planar unit, the clamping device comprising:

a connecting unit having a first connecting portion having a groove; the groove forming a gap on a surface of the connecting unit; and a width of the gap being less than a maximal width of the groove; and a second connecting portion, wherein the planar unit is connected to the first connecting portion by being disposed through the gap; and two clamping units mounted on the second connecting portion of the connecting unit, and the two clamping units arranged side by side and capable of moving toward or away from each other; each one of the clamping units comprising:

a connecting end connected to the second connecting portion; and a clamping end extending along a direction away from the connecting unit.

2. The clamping device for hanging as claimed in claim 1, wherein the clamping device for hanging further comprises:

an adjusting assembly connected to the two clamping units, and the adjusting assembly capable of adjusting a distance between the two clamping units.

3. The clamping device for hanging as claimed in claim 2, wherein the adjusting assembly comprises:

a threaded rod mounted and penetrating through the two clamping units;

a handle connected to an end of the threaded rod; and a nut screwed on the threaded rod, and the two clamping units located between the handle and the nut.

4. The clamping device for hanging as claimed in claim 3, wherein each one of the clamping units comprises:

a bent portion located between the connecting end and the clamping end, and the bent portion of each one of the clamping units protruding toward another one of the clamping units, and the threaded rod mounted and penetrating through the bent portions of the two clamping units.

5. The clamping device for hanging as claimed in claim 4, wherein each one of the clamping units comprises:

an abutting portion connected to the clamping end, and the abutting portion extending towards another one of the clamping units.

6. The clamping device for hanging as claimed in claim 1, wherein each one of the clamping units comprises:

an abutting portion connected to the clamping end, and the abutting portion extending towards another one of the clamping units.

7. The clamping device for hanging as claimed in claim 1, wherein an engaging rod is mounted at an edge of the planar unit, and engages in the groove of the first connecting portion of the connecting unit.

8. The clamping device for hanging as claimed in claim 7, wherein the second connecting portion further comprises:

two wing parts connected to two opposite sides of the first connecting portion respectively and extending along directions away from each other, and two slots formed through the two wing parts, and the connecting ends of the two clamping units disposed in the two slots respectively.

9. The clamping device for hanging as claimed in claim 8, wherein the connecting end of each one of the clamping units is bent and hook-shaped.

10. The clamping device for hanging as claimed in claim 1, wherein the second connecting portion further comprises:

two wing parts connected to two opposite sides of the first connecting portion respectively and extending along directions away from each other; and two slots formed through the two wing parts, and the connecting ends of the two clamping units disposed in the two slots respectively.

11. The clamping device for hanging as claimed in claim 10, wherein the connecting end of each one of the clamping units is bent and hook-shaped.

* * * * *